United States Patent [19]
Anderson

[11] 3,838,323
[45] Sept. 24, 1974

[54] EDDY CURRENT DYNAMOMETER SPEED CONTROL CIRCUIT AND METHOD

[75] Inventor: Harold E. Anderson, Los Angeles, Calif.

[73] Assignee: McCulloch Corporation, Los Angeles, Calif.

[22] Filed: Feb. 5, 1973

[21] Appl. No.: 329,400

[52] U.S. Cl. ................ 318/302, 318/327, 310/105
[51] Int. Cl. ................... H02k 49/00, H02p 15/00
[58] Field of Search .................. 318/302, 326–328; 310/101, 102, 105, 106, 107, 108

[56] References Cited
UNITED STATES PATENTS
3,450,912  6/1969  Vallee ............................... 310/105
3,599,764  8/1971  Daab ................................ 318/302

*Primary Examiner*—Robert K. Schaefer
*Assistant Examiner*—Thomas Langer
*Attorney, Agent, or Firm*—Burns, Doane, Swecker & Mathis

[57] ABSTRACT

An eddy current dynamometer speed control circuit includes transistors connected in series with the motor field coil and the absorbing field coil to control the current in the coils in a continuously variable manner to effect changes between a braking mode and a motoring mode responsively to dynamometer speed changes. The speed control circuit utilizes a regulated voltage onto which is impressed a tachometer signal having an amplitude related to the speed of the dynamometer input/output shaft. Control voltages for the transistors are applied through Zener diodes each of which function as a threshold circuit to control the initial acceleration of the input/output shaft of the dynamometer and for causing a full motoring field to be applied responsively to abnormally large speed drops for quick recovery. A current sharing transistor circuit is also disclosed.

12 Claims, 3 Drawing Figures

3,838,323

EDDY CURRENT DYNAMOMETER SPEED CONTROL CIRCUIT AND METHOD

BACKGROUND OF THE INVENTION

This invention relates to eddy current dynamometers and more particularly to a method and apparatus for increasing the sensitivity of eddy current dynamometers to dynamometer input/output shaft speed changes.

A problem with control circuits for dynamometers is the sensitivity of the control circuit to changes in speed of the input/output shaft thereof above and below the desired speed. More particularly, it is desirable to engender a mode change between a braking mode and a motoring mode (or vice versa) for very small changes in input/output shaft speed above and below the desired speed.

For instance, control systems utilizing silicon controlled rectifiers (SCRs), diodes thyratrons and the like for duty cycle regulation in which current is periodically switched to an appropriate coil are generally relatively insensitive to small changes in speed of the dynamometer input/output shaft due to crossover hysteresis and overcommittal of the circuits. As much as a 300 rpm speed change is oftentimes necessary for the system to change from a braking to a motoring mode. This is due in part to the drop or increase in speed necessary for SCR or thyratron firing because of the inability of an SCR to initiate conduction until the correct half cycle of the source, and the inability to terminate conduction once initiated during the half cycle. Other systems which function in a discontinuous or switching mode to switch predetermined voltages across the absorbing field coil are also generally insensitive to speed changes of, for instance, 5 to 6 rpm. In addition, circuits of this type also suffer from switching transients.

In another type prior art control system, dynamometer fields are energized in a pulse control mode with the number of pulses delivered over a given period of time controlling the energization of the coils and therefore the mode of operation of the dynamometer. It will be appreciated that pulse control systems require complicated circuitry and complex systems for setting the desired speed of the dynamometer.

In addition to the problems noted hereinbefore, the prevention of motor runaway is oftentimes ineffective in the control systems of the prior art.

It is accordingly an object of this invention to obviate the deficiencies of the prior art by providing a novel method and speed control circuit for an eddy current dynamometer in which the current in the motoring field coil and the absorbing field coil of the dynamometer are continuously variable once the dynamometer has reached a desired speed.

It is another object of this invention to provide a novel method and control circuit for an eddy current dynamometer in which the mode change response time relative to the speed of the dynamometer is reduced.

It is yet another object of this invention to provide a novel eddy current dynamometer and method for regulating the speed thereof, in which transistors are utilized in the control circuit for the motoring and absorbing field coils of the dynamometer.

It is a still further object of this invention to provide a novel method and system for controlling the speed of an eddy current dynamometer in which the desired speed of the eddy current dynamometer is controlled by a regulated d.c. signal combined with a d.c. control signal having an amplitude related to the speed of the dynamometer.

It is a yet still further object of this invention to provide a novel method and circuit for controlling the speed of an eddy current dynamoneter in which the energization of the field coils controlling the speed of the dynamometer during initial energization and for abnormally large speed drops is under the control of threshold circuits while the mode of operation of the dynamometer for normal operation after reaching the desired speed is controlled in a continuously variable manner.

The utilization of multiple transistors in parallel to share the current requirements is well known. Because of thermal runway problems, the transistors of known circuits must be carefully matched and mounted on a common heat sink.

It is another object to provide a novel transistor current sharing circuit which eliminates the need for matched transistors and a common heat sink.

These and other objects of the invention will be readily apparent to one skilled in the art to which the invention pertains from the claims and from the following detailed description when read in conjunction with the appended drawings.

DETAILED DESCRIPTION

Figure 1:
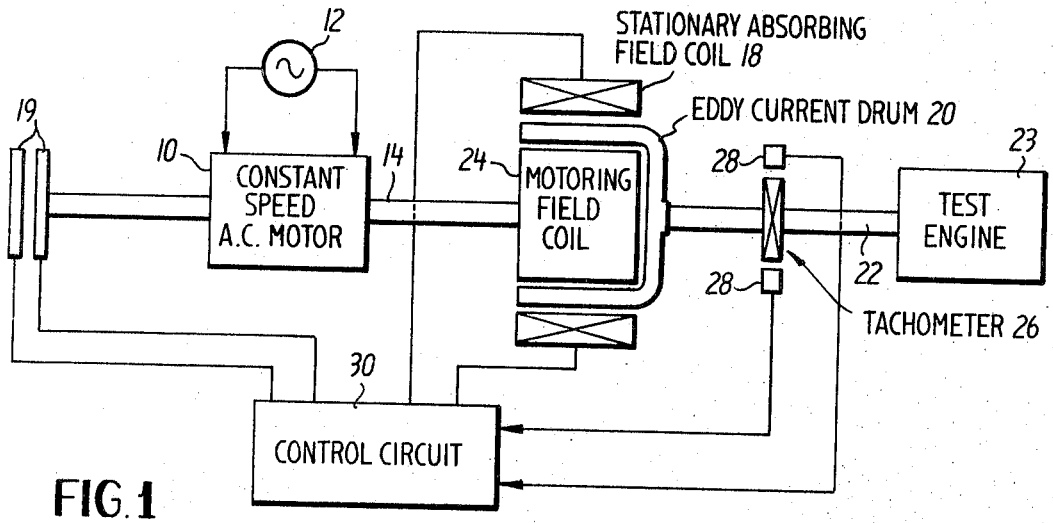
FIG. 1 is a schematic diagram in block form of an eddy current dynamometer of the present invention.

Referring to FIG. 1, an eddy current dynamometer may include a constant speed a.c. induction motor 10 energized from a suitable a.c. source 12 and carrying on the output shaft 14 thereof a motoring field coil 24. Overlying the motoring field coil 24 is an eddy current drum 20. Radially outward of the drum 20 is the stationary absorbing field coil 18 which is connected to the control circuit 30 as will hereinafter be explained in greater detail in connection with FIGS. 2 and 3.

The eddy current drum 20 is provided with an input/output shaft 22 which is in turn coupled to a test engine 23. Also carried by the input/output shaft 22 is a tachometer 26 with the output coils 28 thereof connected to the control circuit 30 as will hereinafter be described in greater detail in connection with FIG. 2.

The control circuit 30 is also provided with suitable leads connected to the motoring field 24 by way of suitable slip rings 19.

In operation, the control circuit 30 is adjusted to provide a full absorbing field and a complete absence of motoring field. The energization of the constant speed a.c. motor 10 from a source 12 drives the motoring field coil 24 by way of the shaft 14. The absorbing field is thereafter reduced by the control circuit 30 almost to zero and the motoring field thereafter increased by the control circuit 30 through the slip rings 19. The reduction of the absorbing field prior to an increase in the motoring field reduces the interaction thereof and thus materially lessens the likelihood of stalling the a.c. motor 10.

As the motoring field is increased by the control circuit 30, the eddy current drum 20 is clutched to the motoring field coil 24 to drive the test engine 23 at the desired speed. The output signal from the tachometer 26 is fed back to the control circuit 30 to effect minor changes in the motoring and absorbing fields to maintain the engine at the desired speed. As will hereinafter be explained, the motoring field is reduced to zero after 4 or 5 volts across the absorbing field coil 18.

The a.c. motor 10 and the motoring field coil 24 are mounted in a cradle (not shown) connected to a scale beam or other form of torque indicating apparatus in a manner well known in the art. Since the details of the cradle mounting and torque indicating apparatus form no part of this invention, such details have not been shown in the interest of clarity.

The transition between braking and motoring modes is not smooth in generally known systems because of overcommittal of the control circuit due to the biasing requirements for SCRs, thyratrons, and the like, and delay in the mode change will materially affect torque measurements. For instance, if mode change is delayed until such time as a significant change (i.e., as much as 200-300 rpm) in the rotational speed of the input/output shaft 22 occurs, measurements made during this time may be inaccurate due to changes in speed.

Figure 2:
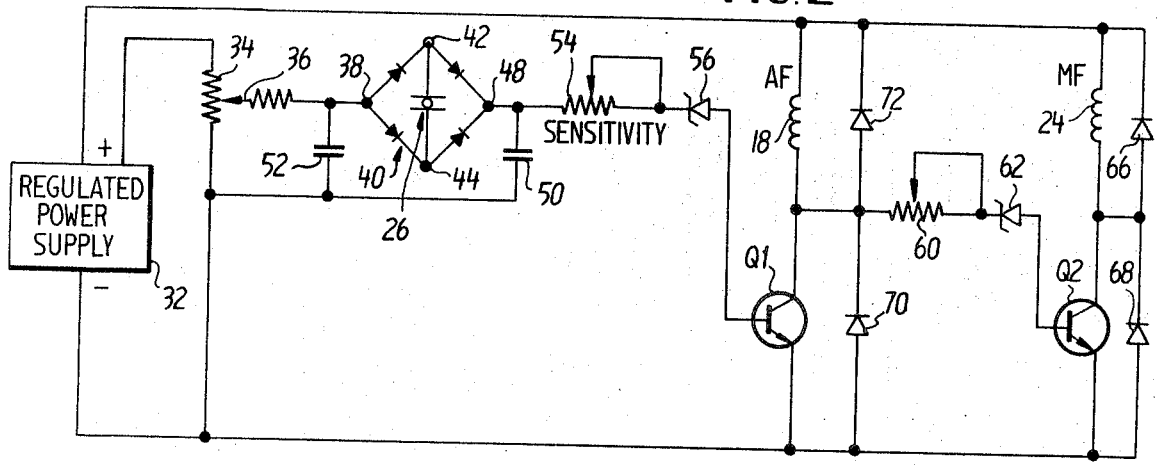
FIG. 2 is a schematic diagram of the control circuit for the eddy current dynamometer of FIG. 1; and, FIG. 3 is a schematic diagram of a transistorized current control circuit which may be substituted for the transistors of the circuit of FIG. 2.

That portion of the control circuit 30 which provides for smooth, continuously variable control of the motoring field coil 24 and the absorbing field coil 18 after the input/output shaft 22 has attained a desired speed is illustrated in FIG. 2 and may include a regulated power supply 32 across which may be connected a speed control potentiometer 34. A wiper arm 36 of the potentiometer 34 may be connected to an input terminal 38 of a diode bridge rectifying circuit 40. The diode bridge rectifying circuit 40 may include two diametrically opposite terminals 42 and 44 across which may be connected a tachometer generator or alternator 26 which generates an a.c. output signal having a peak-to-peak amplitude corresponding to the speed of the input/output shaft 22 of FIG. 1. The diode rectifying bridge 40 may be provided with an output terminal 48 which may be connected to the negative side of the power supply 32 through a smoothing capacitor 50. The input terminal 38 of the diode bridge circuit 40 may also be connected through a capacitor 52 to the negative side of the regulated power supply 32.

The output terminal 48 of the diode bridge circuit 40 may be connected through a potentiometer 54 to the cathode electrode of a Zener diode 56. The anode electrode of the Zener diode 56 may be connected to the base electrode of a transistor $Q_1$ which may have the collector electrode thereof connected through the absorbing field coil 18 of FIG. 1 to the positive side of the regulated power supply 32. The emitter electrode of the transistor $Q_1$ may be coupled to the negative side of the regulated power supply 32.

A terminal 58 between the absorbing field coil 18 and the collector electrode of the transistor $Q_1$ may be connected through a potentiometer 60 to the cathode electrode of a second Zener diode 62, the anode electrode of which may be coupled to the base electrode of a second transistor $Q_2$ having the emitter electrode thereof connected to the negative side of the regulated power supply 32. The collector electrode of the transistor $Q_2$ may be connected through the motoring field coil 24 of FIG. 1 to the positive side of the regulated power supply 32. A terminal 64 between the collector electrode of the transistor $Q_2$ and the motoring field coil 24 may be connected through a diode 66 to the positive side of the regulated power supply 32 to the terminal 64. A diode 70 may be connected from the negative side of the regulated power supply 32 to the terminal 58 and through a diode 72 to the positive side of the regulated power supply 32.

In operation, the desired speed of the input/output shaft 14 of FIG. 1 may be set by the wiper arm 36 of the potentiometer 34. In one embodiment the regulated power supply may deliver a 100 volt d.c. potential. Initially, the wiper arm 36 may be connected directly to the positive side of the regulated power supply 30 so that current will flow through the diode bridge 40, and through the potentiometer 54 and the Zener diode 56 when in the reverse bias breakdown mode. In the embodiment described, the Zener diode may have a reverse bias breakdown voltage of 89 volts. Upon reverse bias breakdown, the Zener diode will apply a d.c. signal to the base electrode of the transistor $Q_1$ to render the transistor $Q_1$ conductive. The conduction of the transistor $Q_1$ may then allow current to flow through the absorb field coil 18 to resist turning of the input/output shaft 22 of FIG. 1.

When it is desired to cause the dynamometer input/output shaft 14 to start motoring at a certian speed, the wiper arm 36 may be set at a voltage less than the reverse bias breakdown voltage of the Zener diode 56, e.g., < 89 volts. The interruption of the potential at the base electrode of the transistor $Q_1$ renders the transistor $Q_1$ nonconductive so that no current flows through the absorbing field coil 18. Upon the removal of current from the absorbing field coil 18, the voltage drop thereacross is reduced to zero such that the voltage at the terminal 58 rises to that available at the positive side of the power supply. The rise in voltage at the terminal 58 may be coupled across the potentiometer 60 and may cause a reverse bias breakdown of the Zener diode 62 which may be provided with a reverse breakdown voltage of, for instance, 97 volts d.c. The reverse bias breakdown of the diode 62 having been affected, the potential available at the cathode of the Zener diode 62 is applied to the base electrode of the transistor $Q_2$ rendering it conductive. When the transistor $Q_2$ is rendered conductive, current is applied to the motor field coil 24 for coupling the a.c. motor to the dynamometer input/output shaft.

As the dynamometer begins to motor, the speed of the input/output shaft 22 may be monitored by the tachometer 26 of FIG. 1, which in one embodiment causes an output signal of approximately ten volts peak per 1,000 rpm to be generated by the tachometer generator output coils 28. This voltage is applied across the diode bridge 40 and is subsequently rectified. The d.c. signal from the wiper arm 36 is also applied to the diode bridge 40 such that the rectified output signal from the tachometer generator 26 is added to the voltage tapped by the wiper arm 36 of the potentiometer 34. It will be appreciated that the voltage available at the wiper arm 36 is less than the reverse bias breakdown voltage of the diode 56 when the dynamometer is first caused to motor.

When the voltage added to the voltage tapped by the wiper arm 36 is such as to cause a reverse bias breakdown of the Zener diode 56, the transistor $Q_1$ is rendered conductive. The transistor $Q_1$ conductivity is then dependent upon the amount by which the voltage at the base electrode thereof exceeds the reverse bias breakdown voltage of the diode 56. The voltage applied to the base electrode of the transistor $Q_1$ is the tapped potential minus the breakdown potential plus the tachometer-generated potential, and the base speed is thus determined by the amount the tapped potential at the wiper arm 36 is below the reverse bias breakdown voltage of the diode 56 plus the peak-to-peak amplitude of rectified a.c. signal added thereto. The current applied to the absorbing field coil 18 is therefore related, e.g., proportional, to the sensed input/output shaft 22 speed.

Upon the flow of current through the absorbing field coil 18, the potential at the terminal 58 falls to reduce the amount of current in the motor field coil 24 in inverse proportion to the amount the input/output shaft 22 speed exceeds the desired speed. When the input/output shaft speed drops below the desired speed, the conduction of the transistor $Q_1$ is diminished, the absorbing field is decreased, and the motoring field is increased responsively thereto.

The Zener diodes 56 and 62 function in a similar fashion to provide thresholds below which motor speed is controlled in a full-on/full-off manner, e.g., the coils are operated one fully energized and the other fully de-energized. However, once the desired speed has been achieved the circuit operates to limit the speed of the input/output shaft 22 in a continuously variable manner with the transistors $Q_1$ and $Q_2$ serving as current valves rather than current switches. In this manner, the transition from motoring to braking is smooth and does not depend upon the reverse biasing characteristics of the bodies. One result of this operation is that sensitivity to small variations of the input/output shaft speed above and below the desired speed is increased because currents through the coils 18 and 24 are adjusted by just the amount necessary to return the dynamometer to the desired speed. However, should the dynamometer speed drop abnormally, the voltage available at the output terminal 48 of the diode bridge 40 may be insufficient to cause a reverse bias breakdown of the Zener diode 56. Under this condition maximum current is applied to the motor field coil 24 and the absorbing field coil 18 is reduced for accelerating the dynamometer 17 as fast as possible.

The additional voltage required to overcome the reverse bias breakdown voltage of the Zener diodes 56 and 62 is controlled by the potentiometers 54 and 60. These potentiometers therefore set the threshold limits below which the circuit operates in an On/Off switching mode rather than in a continuously variable mode for accommodating abnormal changes in the rotational speed of the input/output shaft 22. The voltage drop across these potentiometers also determines the sensitivity of the dynamometer system.

In one operative embodiment the desired speed may be set at 800 rpm. When a test engine 10 such as shown in FIG. 1 starts firing it feeds power to the input/output shaft 22. In the absence of control, the speed of the input/output shaft may rise above 800 rpm which causes the transistor $Q_1$ to conduct more current. This additional current flows through the absorbing field coil 18 to increase the eddy current braking field which resists or brakes the rotation of the input/output shaft. Simultaneously, the signal applied to cause the transistor $Q_2$ to conduct is reduced, whereby motoring power is reduced. The speed regulation of plus or minus 5 rpm is easily maintained with little or no hunt due to the extremely fast response of the transistors (1 megahertz or better).

Figure 3:
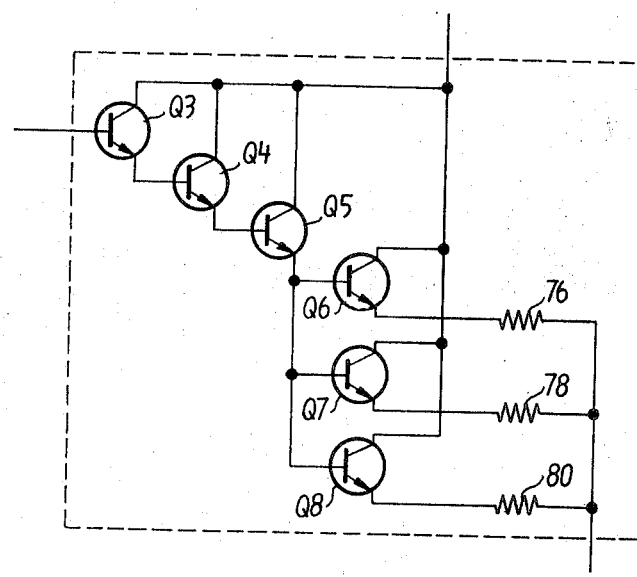

Referring now to FIG. 3, a transistorized current control or valving circuit 74 may be substituted for the transistors $Q_1$ or $Q_2$ in the circuit of FIG. 2. The current control circuit 74 includes cascaded transistors $Q_3$, $Q_4$ and $Q_5$, in which the collector electrodes thereof may be interconnected and connected to the terminal 58 of the circuit of FIG. 2. The base electrode of the transistor $Q_3$ may be connected to the anode electrode of the Zener diode 56 with the emitter electrode of the transistor $Q_3$ connected to the base electrode of the transistor $Q_4$, and with the emitter electrode of the transistor $Q_4$ being connected to the base electrode of the transistor $Q_5$. The emitter electrode of the transistor $Q_5$ may be connected in parallel to the base electrodes of the transistors $Q_6$, $Q_7$ and $Q_8$. The transistors $Q_6$, $Q_7$ and $Q_8$ may be high power transistors having low base-to-emitter resistances to reduce the likelihood of motor runaway. The collector electrodes of the transistors $Q_6$, $Q_7$ and $Q_8$ may be interconnected and also connected to the terminal 58. The emitter electrode of the transistor $Q_6$ may be connected through a resistor 76 to the negative side of the regulated power supply, with the emitter electrodes of the transistors $Q_7$ and $Q_8$ connected respectively through resistors 78 and 80 also to the negative side of the regulated power supply.

In operation, the transistors $Q_6$, $Q_7$ and $Q_8$ serve to increase the current carrying capacity over that of the single transistors illustrated in FIG. 2. The basic function of the circuit of FIG. 3 is the same as that of transistors $Q_1$ or $Q_2$ of FIG. 2 in that, upon the application of a positive potential to the base electrode of the transistor $Q_3$, the transistors $Q_3$ through $Q_8$ begin to conduct to increase the current through the associated field coil. A reduction in the potential applied to the base electrode of the transistor $Q_3$ reduces the conduction of the transistors $Q_3$ through $Q_8$ and thus reduces the current in the associated field coil.

As is well known, the base-to-emitter electrode voltage of a transistor decreases with an increase in heat. With a common potential at the base electrodes of the transistors $Q_6 - Q_8$, any unmatch in the transistors or variation in the temperature thereof will tend to produce thermal runaway. However, the utilization of the resistors 76–80 respectively in the emitter circuits of the transistors $Q_6 - Q_8$ prevent runaway by back biasing the emitter electrode as the voltage drop across the resistor increases with an increase in current. It is thus possible to divide the current among several transistors without elaborate matching of the transistors and the heat sink associated therewith.

ADVANTAGES AND SCOPE OF THE INVENTION

From the foregoing description it will be appreciated that the control circuit of FIG. 2 responds quickly to very small changes in the speed of the input/output shaft 22 of FIG. 1 about the selected speed. It is therefore possible with the circuit of FIG. 2 to maintain the speed of the input/output shaft 22 of FIG. 1 plus or minus five rpm about a speed of 800 rpm. Hunting or overcommittal of the prior art systems is virtually eliminated in the present transistorized circuit due to the fast acting transistors which may have a frequency response of one megahertz or better.

In addition, the present system operates in a bistable or switch mode for quickly restoring the speed of the input/output shaft 14 to the preset speed for abnormal drops in the speed of the input/output shaft 22 of FIG. 1. The cascaded transistorized current control circuit of FIG. 3 permits the use of relatively low power transistors to control the current in the absorbing field coil 18 and the motor field coil 24 without sacrificing any speed of operation. It will be further appreciated that the speed of the dynamometer can be easily set and does not depend upon the current flowing in the armature loop.

The necessity for extremely close tolerances in the transistors of a current sharing circuit has been obviated as has the need for an elaborate common heat sink by the utilization of resistors in the emitter circuits of the parallel transistors.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A dynamic speed control system for an eddy current dynamometer including a motor field coil, an absorbing field coil and an eddy current drum mechanically connected to an input/output shaft, comprising:
   tachometer means for generating a signal having an amplitude related to the speed of the input/output shaft of the dynamometer; and,
   continuously variable transistor means for controlling in a continuously variable manner the current in the absorbing and motor field coils responsively to the amplitude of said tachometer signal to regulate the rotational speed of the dynamometer input/output shaft.

2. The system of claim 1 wherein said current control means includes:
   means for providing a d.c. signal;
   means responsive to the d.c. and tachometer signals for providing a control signal; and,
   means for applying said control signal to said transistor means.

3. The system of claim 2 wherein said transistor means includes:
   first current valving means for controlling the current in the absorbing field coil; and,
   second current valving means for controlling the current in the motor field coil responsive to current through said first circuit valving means.

4. The system of claim 3 and further including means for significantly increasing the response of said second current valving means to the control signal for values of the control signal below a predetermined threshold.

5. The system of claim 2 wherein the control signal includes a first control potential and wherein said transistor means includes first and second transistors, the first transistor controlling current in the absorbing field coil responsively to the first control potential and the second transistor controlling current in the motor field coil, the current through the first transistor determining a second control potential at one end of the absorbing field coil, and
   means for applying the second control potential to the second transistor to control the current in the motor field coil.

6. The system of claim 5 and further including means for blocking said control potentials to each of said transistors for potential values below predetermined thresholds.

7. The system of claim 6 wherein said transistor means includes a plurality of cascaded transistors, the collector electrodes of said cascaded transistors being interconnected and the emitter electrode of each of said cascaded transistors being connected to the base electrode of the next succeeding transistor in the cascade, the emitter electrode of the last of said cascaded transistors being connected to the base electrodes of a plurality of load transistors, the collector electrodes of said plurality of load transistors being interconnected with the collector electrodes of said plurality of cascaded transistors and the emitter electrode of each of said load transistors being connected through an impedance element to a common terminal.

8. The system of claim 1 wherein said transistor means includes a plurality of cascaded transistors, the collector electrodes of said cascaded transistors being interconnected and the emitter electrode of each of said cascaded transistors being connected to the base electrode of the next succeeding transistor in the cascade, the emitter electrode of the last of said cascaded transistors being connected to the base electrodes of a plurality of load transistors, the collector electrodes of said load transistors being interconnected with the collector electrodes of said cascaded transistors and the emitter electrode of each of said transistors being connected through an impedance element to a common terminal.

9. A dynamic speed control for an eddy current dynamometer having a motor field coil and an absorbing field coil comprising:
   means for generating a d.c. signal having an amplitude related to the speed of said dynamometer; and,
   continuously variable current control means for varying in a continuously variable manner the current through the coils responsively to the amplitude of said d.c. signal to control the speed of the dynamometer responsively to variations in the speed of the dynamometer above and below a predetermined speed.

10. The dynamic speed control of claim 9 wherein said control means includes transistor means responsive to said d.c. signal for varying the current through the coils, said transistor means including a plurality of cascaded transistors, the collector electrodes of said cascaded transistors being interconnected and the emitter electrode of each of said cascaded transistors being connected to the base electrode of the next succeeding transistor in the cascade, the emitter electrode of the last of said cascaded transistors being connected to the base electrodes of a plurality of load transistors, the collector electrodes of said plurality of load transistors being interconnected with the collector electrodes of said plurality of cascaded transistors and the emitter electrode of each of said load transistors being connected through an impedance element to a common terminal.

11. A method for controlling the speed of an eddy current dynamometer having motoring and absorbing coils each energized through an electrically conductive path from a source of electric current, comprising the step of regulating the current in each of the coils in a continuously variable manner responsively to the speed of the dynamometer, by continuously varying the electrical conductivity of each said path.

12. The method of claim 11 wherein said regulating step includes the steps of:

applying current to the motoring coil to permit the dynamometer to achieve a predetermined base speed, applying current to the absorbing coil and reducing current to the motoring coil by amounts related to the amount the speed of the dynamometer exceeds the predetermined base speed; and, reducing current to the absorbing coil and increasing current to the motoring coil by amounts related to the amount the speed of the dynamometer is less than said predetermined speed.

* * * * *

UNITED STATES PATENT OFFICE
CERTIFICATE OF CORRECTION

Patent No. 3,838,323  Dated September 24, 1974

Inventor(s) Harold E. Anderson

It is certified that error appears in the above-identified patent and that said Letters Patent are hereby corrected as shown below:

Col. 2, line 8, change "dynamoneter" to --dynamometer--.

Col. 2, line 57, after "field" insert --coil--.

Col. 4, line 13, change "14" to --22--.

Col. 5, line 38, change "bodies" to --diodes--.

Col. 7, line 8, change "14" to --22--.

Claim 3, line 7, change "circuit" to --current--.

Signed and sealed this 7th day of January 1975.

(SEAL)
Attest:

McCOY M. GIBSON JR.
Attesting Officer

C. MARSHALL DANN
Commissioner of Patents